Sept. 22, 1931.   S. J. HOFF   1,824,083
COTTER PIN TOOL
Filed March 5, 1930
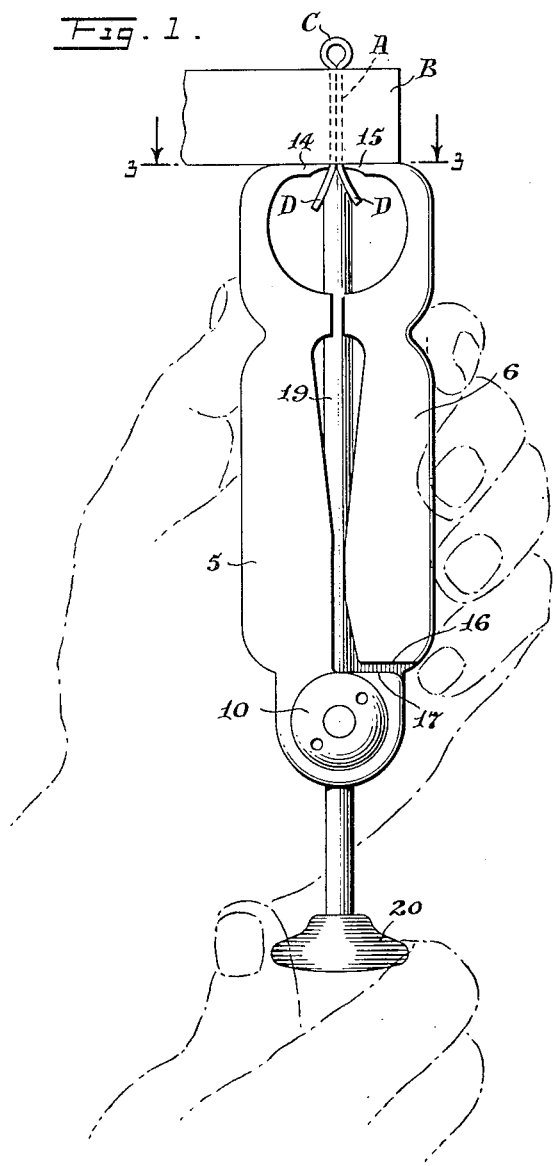
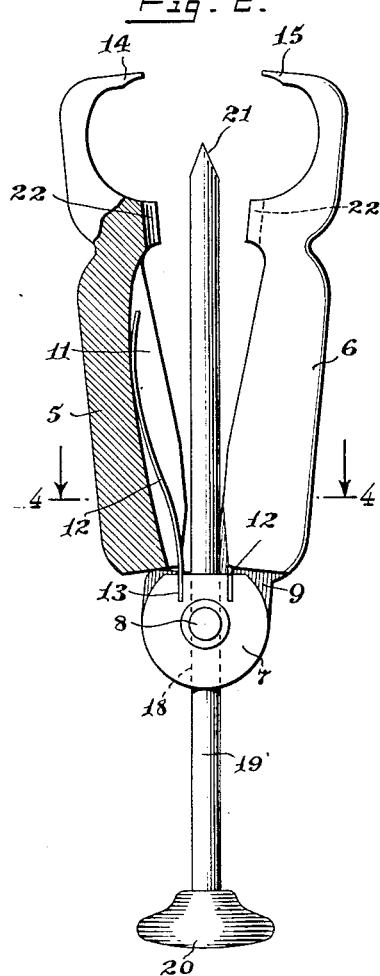
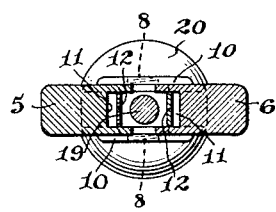
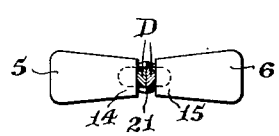
INVENTOR
Sigurd J. Hoff
BY
ATTORNEYS Patented Sept. 22, 1931

1,824,083

UNITED STATES PATENT OFFICE

SIGURD J. HOFF, OF BROOKLYN, NEW YORK

COTTER PIN TOOL

Application filed March 5, 1930. Serial No. 433,388.

This invention relates to tools or implements, and has particular reference to a device for holding and expanding the legs of cotter pins after the same have been actively positioned.

Up to the present time, the spreading of the legs of cotter pins has been accomplished in various ways by make-shift tools or implements which are inefficient, due to the fact that they were not properly designed or particularly intended for the purpose.

The present invention aims for one of its objects to provide a tool which is especially designed for the purpose of expanding the legs of a cotter pin to insure the proper spreading of the same in such a manner as to retain the pin in its active position.

The invention further comprehends a tool or implement of the character set forth which serves to hold the head end or eye of the cotter pin in proper contact with the object with which it is associated, during the spreading or expanding of the legs.

Other objects of the invention reside in the simplicity of construction and mode of use of the tool, the economy with which the same may be produced and the general efficiency derived therefrom.

With the above recited and other objects in view, reference is had to the following description and acompanying drawings, in which there is exhibited one example or embodiment of the invention, while the claims define the actual scope of the same.

In the drawings:

Figure 1 is a side view of the tool illustrating the same in its active use.

Figure 2 is a side view with parts broken away and shown in section to disclose the underlying structure.

Figure 3 is a sectional view taken approximately on the line indicated at 3—3 in Figure 1.

Figure 4 is a similar view taken approximately on the line indicated at 4—4 in Figure 2.

Referring to the drawings by characters of reference, the tool includes a pair of jaws 5 and 6 which are of substantially identical construction and which jaws are pivotally associated at one end by means of a pivot block 7 having oppositely projecting trunnions 8 which extend through the apertured leaves 9 of the jaws 5 and 6 and which receive thereover a nut 10. The inner confronting faces of the jaws 5 and 6 are grooved or hollowed out as at 11, to receive the leaf springs 12 which are anchored as at 13 in the pivot block 7. The free ends of the jaws 5 and 6 are provided with clamping terminals 14 and 15 which are relatively thin. The leaf springs 12 function to normally move the jaws 5 and 6 relatively away from each other a limited distance, which is controlled by the engagement of the shoulders 16 and 17 provided respectively on the leaves 9 of the jaws. This obviously spreads the clamping terminals 14 and 15 normally apart. The pivot block 7 is provided with a longitudinal aperture or bore 18 which receives therethrough a shaft or shank 19 formed at the outer end with a manipulating head 20 and at the inner end with a double beveled extremity 21. The confronting faces of the jaws 5 and 6 are further provided with guide or bearing grooves 22 adapted to coact with each other to guide the shaft or shank 19.

In use and operation, the cotter pin A is inserted through the opening in the element B with which it is associated until the eye or head end C contacts with the element B. The clamping terminals 14 and 15 of the tool are then clamped into engagement with the protruding free extremities D of the cotter pin legs as illustrated in Figure 1, by grasping and advancing the jaws 5 and 6 toward each other. The shank or shaft 19 is retracted up to this point and is advanced inwardly until the double beveled extremity 21 enters between the terminals D of the cotter pin legs which extend beyond the clamping terminals 14 and 15. Obviously, further inward movement of the shank or shaft 19 will effect a spreading, expansion or separation of the leg terminals to a position which will actively retain the cotter pin in place.

What is claimed is:

1. A cotter pin tool including a pair of jaws for gripping the protruding ends of the legs of a cotter pin for retaining said cotter pin in active position and means movably carried by the jaws for expanding said protruding ends of the legs while gripped by the jaws.

2. A cotter pin tool including means for clamping the protruding ends of the legs to retain a cotter pin in applied position and relatively movable means for spreading and bending the free terminals of the legs while so clamped.

3. A cotter pin tool including means for clamping and retaining a cotter pin in applied position and means for spreading and bending the free terminals of the legs thereof, said means consisting of a pair of jaws having hinged connection at one end and defining at the opposite free ends a pair of clamping terminals adapted to grip the legs of the cotter pin and hold the same in its applied position and an element slidable through said jaws for engaging between and spreading the free ends of the cotter pin legs which extend beyond the jaws.

4. A cotter pin tool including a pair of mating normally opened jaws having clamping terminals at one end, means pivotally connecting the same and an element slidably extending through said connecting means having a double beveled terminal for spreading the legs of the cotter pin which extend beyond the clamping terminals.

5. A cotter pin tool including a pair of mating normally opened jaws having clamping terminals at one end, means pivotally connecting the same and an element slidably extending through said connecting means having a double beveled terminal for spreading the legs of the cotter pin which extend beyond the clamping terminals, said jaws having mating guide bearings on the confronting faces thereof for guiding said element in its movement.

Signed at Brooklyn in the county of Kings and State of New York this 4 day of March 1930.

SIGURD J. HOFF.